United States Patent [19]

Hendricks et al.

[11] Patent Number: 5,072,538

[45] Date of Patent: Dec. 17, 1991

[54] SKIMMER WITH PIVOTED STRAINER PORTIONS

[75] Inventors: William G. Hendricks, Nashwauk; Richard A. Eimer, Duluth, both of Minn.

[73] Assignee: Tackle Tamer Products, Inc., Keewatin, Minn.

[21] Appl. No.: 620,569

[22] Filed: Dec. 3, 1990

[51] Int. Cl.$^5$ ............................................... A01K 79/00
[52] U.S. Cl. ........................................ 43/4; 294/19.1; 210/470
[58] Field of Search ................... 43/4; 294/19.1, 1.1, 294/53.5; 15/104.05, 104.31; 210/470, 464, 136

[56] References Cited

U.S. PATENT DOCUMENTS

| | | | |
|---|---|---|---|
| 1,420,919 | 6/1922 | Fike | 294/53.5 |
| 3,722,940 | 3/1973 | Misjak | 43/4 |
| 4,240,656 | 12/1980 | Eiffinger | 294/53.5 |
| 4,718,188 | 1/1988 | Roberts | 43/4 |
| 4,978,156 | 12/1990 | Marhula | 43/4 |

Primary Examiner—Richard K. Seidel
Assistant Examiner—Chuck Y. Mah
Attorney, Agent, or Firm—Jerold M. Forsberg

[57] ABSTRACT

A skimmer for removal of debris suspended in a clogged bore includes a handle having a strainer basket assembly at one end and a wrist loop at the other end. The strainer basket assembly includes a hinge block to which more than one strainer basket portion is pivotally attached. Each strainer basket portion is foramenated and attached to the hinge block in a manner such that when the strainer basket assembly is inserted into a clogged bore the strainer basket portions pivot to a closed position and when the strainer basket is withdrawn from the clogged bore the strainer basket portions are pivoted to an open position to catch and remove debris. In different embodiments of the invention there are weights and stops incorporated to facilitate pivoting of the strainer basket portions to the open position.

20 Claims, 3 Drawing Sheets

SKIMMER WITH PIVOTED STRAINER PORTIONS

BACKGROUND OF THE INVENTION

The present invention relates generally to an improved ice skimmer, and more specifically to an ice skimmer which is constructed of nonmetallic materials and which has more than one pivoted strainer basket portion as part of a strainer assembly. The ice skimmer is easily inserted into a hole bored in ice past ice chips and snow, which are clogging the bore, with the strainer basket portions in a closed position. The strainer assembly can then be withdrawn from the clogged bore with the strainer basket portions in an open position wherein a continuous strainer basket is formed to thereby remove the ice chips and snow which are clogging the bore.

Ice fishing is a popular activity during the winter months and one of the more significant problems encountered by ice fisherman is the clearing of a clogged hole which has been bored through the ice of ice chips and snow. Another problem is the removal of ice which forms over the bored hole and snow that collects in and clogs the bored hole at different times during the day. This problem is dealt with by breaking the ice and skimming the ice chips and snow from the clogged bore.

The first step in preparing for fishing through the ice is to use an auger and bore a hole through the ice so that a hook and line or a spear can pass therethrough. In either case the bored hole must be clear and open so that a hook and line are free from obstruction and, when spear fishing, fish that come after a bait being worked in the water below the ice are clearly visible. Accordingly, any ice chips and snow that are suspended in the water and clogging the bore need to be removed.

Prior to the instant invention, there have been a number of prior art devices designed to remove material suspended in a liquid. One prior art device, depicted in U.S. Pat. No. 452,044, shows a foldable strainer portion hinged to a handle for removing butter from buttermilk. Another prior art device, depicted in U.S. Pat. No. 3,289,850, shows a foldable strainer basket hinged to a handle wherein the strainer basket can be deployed beneath ice chips clogging a bore in ice. A combination device which utilizes a fixed strainer basket typical of most of the strainer basket devices commercially available at this time is depicted in U.S. Pat. No. 3,747,253. A collapsible ice removal device, depicted in U.S. Pat. No. 4,718,188, shows a collapsible basket made of a plurality of flexible vanes mounted on the end of a rod with a slidable sleeve expanding the flexible vanes outwardly by pushing an expander disk against the insides of the vanes. Another ice skimming device, depicted in U.S. Pat. No. 3,857,787, shows an ice skimmer shiftable from a generally vertical orientation by a mechanical linkage to a generally horizontal position. U.S. Pat. No. 4,620,387 discloses a device used for ice fishing which is formed of nonmetallic materials.

Nowhere in any of the prior art is there found any teaching of the improved ice skimmer as taught by the instant invention.

SUMMARY OF THE INVENTION

The present invention teaches an improved ice skimmer for removing debris such as ice chips and snow from a hole bored through ice covering a body of water such as covers rivers and lakes during the winter. The ice skimmer is formed of nonmetallic materials and includes a handle having a strap loop at one end and a strainer assembly at the other end. The strainer assembly includes more than one pivotally attached strainer basket portion. Each strainer basket portion is shiftable from a closed position wherein the strainer basket portions are generally parallel to the handle to an open position where they are generally perpendicular to the handle and form a continuous strainer basket which completely encircles one end portion of the handle. The strainer basket portions ideally include provisions for assisting in the deployment of the strainer basket portions to the open position wherein the strainer basket is formed.

It is the simplicity and effectiveness along with the ease with which it can be used that are particular advantages of the instant invention.

Accordingly, it is an object of the present invention to provide an ice skimmer which can be easily inserted into a hole bored through ice covering a body of water and utilized to remove debris clogging the bore.

Another object of this invention is to provide an ice skimmer which has more than one strainer basket portion which is hinged and is individually pivotal relative to a handle. Yet another object of this invention is to provide an ice skimmer which has pivotally attached strainer basket portions as part of a strainer assembly wherein the strainer basket portions pivot to a closed position during insertion into a liquid and debris filled bore and subsequently are deployed to form a continuous strainer basket below debris thereby facilitating removal of debris clogging the bore.

A further object of this invention is to provide an ice skimmer which includes provisions for assisting in the deployment of the freely pivotal strainer basket portions to open positions once the strainer basket portions are below debris in a clogged bore.

Yet another object of the instant invention is to provide an ice skimmer which is formed of nonmetallic materials and is constructed in a simple and economic manner.

Other objects and advantages of the present invention will be apparent and understood from the following detailed description when taken in conjunction with the accompanying drawings.

BRIEF DESCRIPTION OF THE DRAWINGS

An improved ice skimmer constructed in accordance with this invention is described hereinbelow, wherein.

DETAILED DESCRIPTION OF THE PREFERRED EMBODIMENT

Figure 3:
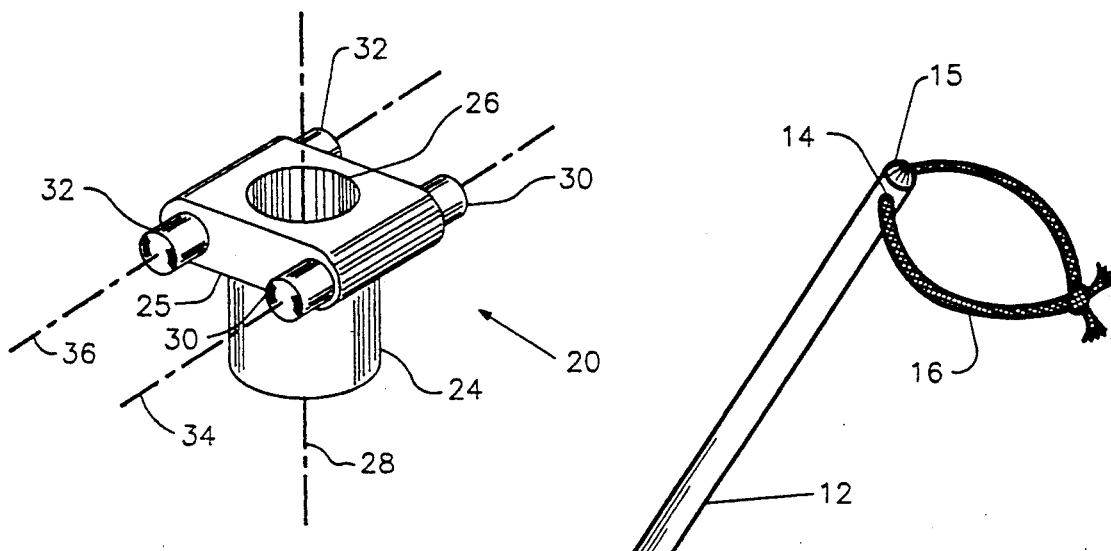
FIG. 3 is a perspective view of the hinge block of the strainer assembly.

Referring now to the drawings, it should be noted that like reference numerals are used throughout the various views to designate similar elements or components.

Ice skimmer 10 includes an elongate handle 12 having a strainer assembly 18 near one end 19 and a transverse bore 14 extending through handle 12 proximate the other end 15. A piece of rope is threaded through transverse bore 14 and tied to form a wrist loop 16.

Figures 1, 2:
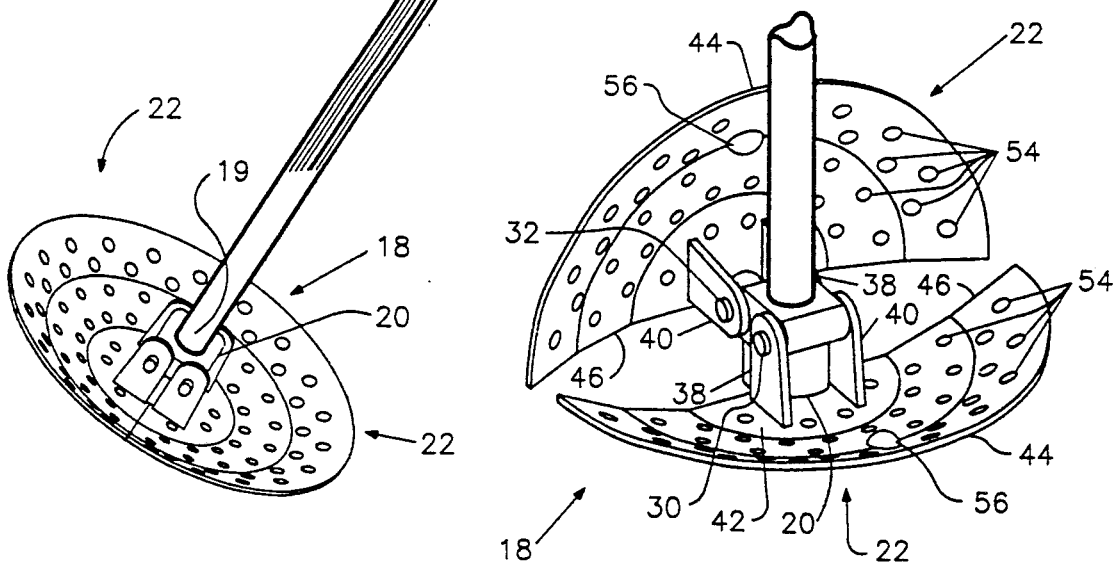
FIG. 1 is a perspective view of the ice skimmer of the instant invention.
FIG. 2 is a partial view showing the strainer assembly of FIG. 1 with one strainer basket portion in the open position and one strainer basket portion in the closed position.

As best seen in FIGS. 1 and 2, the strainer assembly 18 includes a hinge block 20 and a pair of identical strainer basket portions 22. Hinge block 20 includes a cylindrical portion 24, a generally rectangular portion 25, an axial bore 26 having a central axis 28, and two pairs of oppositely extending hinge pins 30 and 32. Axes 34 and 36 extend through the centers of rotation of each respective pair of oppositely extending hinge pins 30 and 32 and perpendicular to central axis 28. Ice skimmer 10 preferably utilizes a wooden handle, one end of which is received in axial bore 26 in hinge block 20 which can be attached by suitable means. Preferably handle 12 has a transverse bore (not shown) near end 19 of the handle 12, i.e. the end opposite the end 15 with wrist loop 16, and hinge block 20 and handle 12 are secured relative to one another by insert molding such that the material of which the hinge block is formed enters the transverse bore and solidifies to fix hinge block 20 relative to handle 12.

Each strainer basket portion 22 includes a pair of hinge arms 38 and 40 which extend substantially perpendicular from a center portion 42. Each strainer basket portion 22 also includes an arcuate peripheral edge 44 and a straight peripheral edge 46 which is interrupted by a cut out 48 such that there is a straight peripheral edge portion 46 on either side of cut out 48. Cut out 48 is complementary in its shape to a portion of the outer periphery of handle 12 and is centrally disposed in center portion 42. Hinge arms 38 and 40 are disposed relative to cut out 48 and include apertures 50 and 52 (see FIG. 10), respectively, for receiving a respective pair of oppositely extending hinge pins 30 and 32. Strainer basket portions 22 are attached to respective pairs of hinge pins by spreading hinge arms 38 and 40 a sufficient distance to permit the oppositely extending hinge pins to be engaged in respective apertures 50 and 52. Hinge arms 38 and 40 are spaced a predetermined distance apart which corresponds to the distance between each pair of oppositely extending hinge pins such that when the hinge pins are engaged in respective apertures 50 and 52 and the hinge arms 38 and 40 are released, the respective strainer basket portion 22 will be securely and pivotally attached to the hinge block 20. Note that reinforcement is employed as necessary and it has been found that reinforcing ribs 53 provided on the hinge arms and along the straight peripheral edge portion 46 is beneficial. Accordingly, as best seen in FIG. 2, each strainer basket portion 22, attached by hinge arms 38 and 40, is free to pivot about a respective axis 34 or 36, with one strainer basket portion shown in the open position while the other strainer basket portion is shown in the closed position to demonstrate the ability of each to pivot freely relative to one another (the open and closed positions are discussed below).

Multiple perforations 54 are arrayed in each strainer basket portion 22 and are sized to permitted water to pass therethrough. The size and number of perforations is determined by the type of debris being removed from a clogged bore.

Again, strainer basket portions 22 are shiftable between a closed position and an open position (see FIG. 2). When strainer basket portions 22 are in the open position, i.e., when the strainer basket portions extend generally perpendicular relative to a longitudinal axis of the handle, cut out 48 abuts handle 12 and acts as a stop and the straight peripheral edge portion of one strainer basket portion abuts the straight peripheral edge portion of the other strainer basket portion and the strainer basket portions complement one another to form a generally concave strainer basket which continuously encircles end 19 of handle 12 (see FIG. 1). A strainer basket portion 22 is in the closed position when the strainer basket portion is generally parallel to the longitudinal axis of handle 12.

Figure 4:
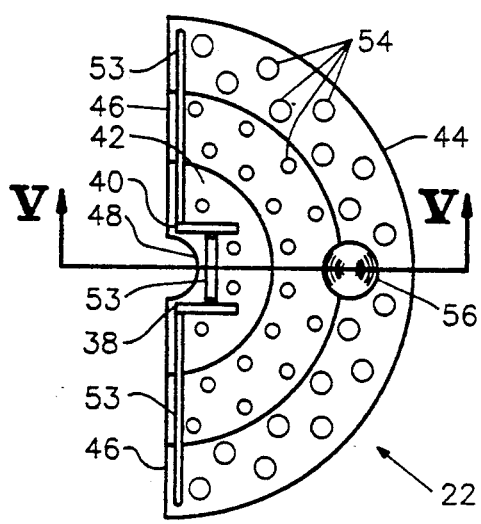
FIG. 4 shows a strainer basket portion with a weight disposed near a peripheral edge thereof.
Figure 5:
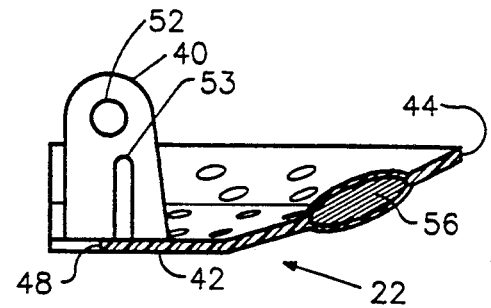
FIG. 5 is a sectional view taken in the direction of arrows V—V in FIG. 4.

A weight 56 is disposed generally proximate the arcuate peripheral edge (see FIGS. 4 and 5). The weight can be attached by any suitable means and preferably is insert molded at the time the strainer basket portions are molded. The amount of weight and the position of the center of gravity of the weight relative to the strainer basket portion is important. The position of the weight is important because when the respective strainer basket portion is in the closed position the center of the weight must be outside of a line which intersects the axis that passes through the center of rotation of the respective hinge pins and is parallel to the longitudinal axis of the handle. The weight must be sufficient to have a tendency to pivot the strainer basket portion about the axis passing through the respective hinge pins from the closed to the open position. Preferably the center of gravity of weight 56 is a very small distance outside of the line parallel to the handle when the strainer basket portion is in the closed position wherein the weight has a tendency to pivot the strainer basket portion to the open position but which tendency can be overcome during insertion of the strainer assembly into a clogged bore by the resistance of water in the bore. Accordingly, the strainer basket portions 22 are held in the closed position during insertion of the strainer assembly into the bore by the resistance of the water therein.

Figure 6:
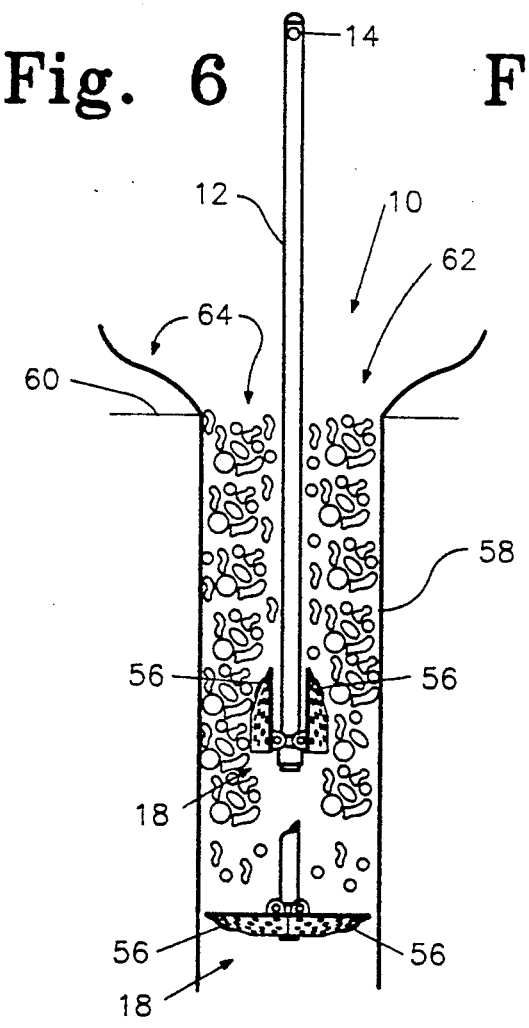
FIG. 6 and FIG. 7 show the relationship of the strainer basket portions relative to the handle during insertion and withdrawal from a clogged bore.
Figure 7:
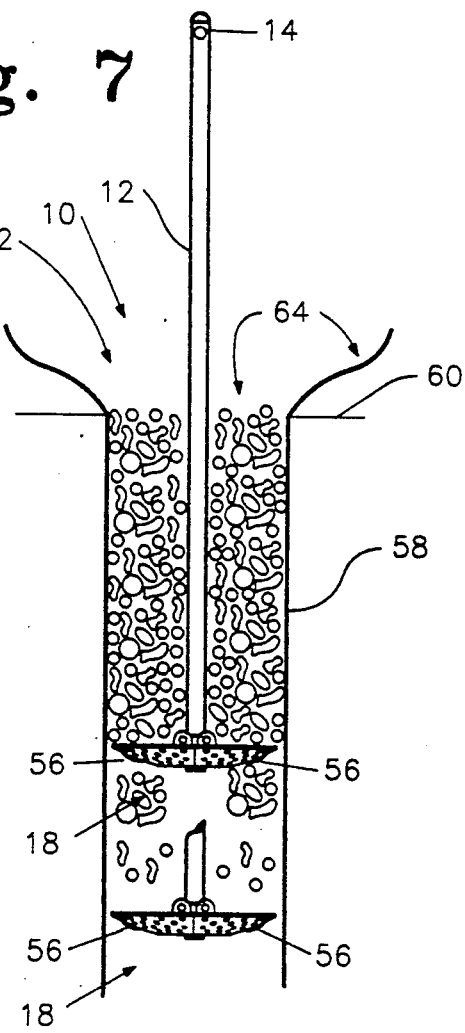

FIG. 6 shows the progression of movement of the strainer basket portions 22 of the ice skimmer 10 as it is inserted into a clogged bore 58 in ice 60 covering a body of water. The strainer basket portions are held in the closed position by the resistance of the water in the clogged bore and because the strainer basket portions are in the closed position the strainer assembly is able to pass more easily through the ice chips 62 and snow 64 which are clogging the bore. Once the strainer assembly is below the ice chips and snow and the downward motion of the ice skimmer is stopped each strainer basket portion is pivoted to the open position by its respective weight 56. As seen in FIG. 7, the ice skimmer is then withdrawn from the clogged bore and in so doing the ice chips and snow clogging the bore are removed.

If debris remains in the clogged bore the procedure is repeated until all debris is removed.

Figure 8:
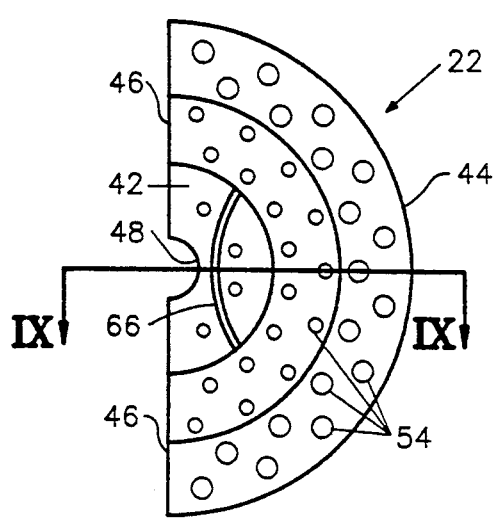
FIG. 8 shows another embodiment of the strainer basket portion wherein a baffle is disposed on the bottom side thereof.
Figure 9:
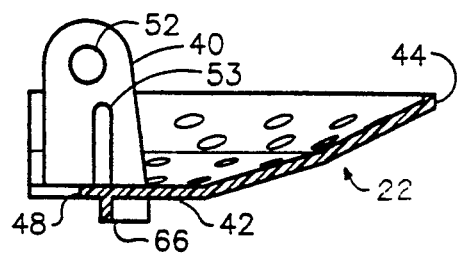
FIG. 9 is a sectional view taken in the direction of arrows IX—IX in FIG. 8.
Figure 10:
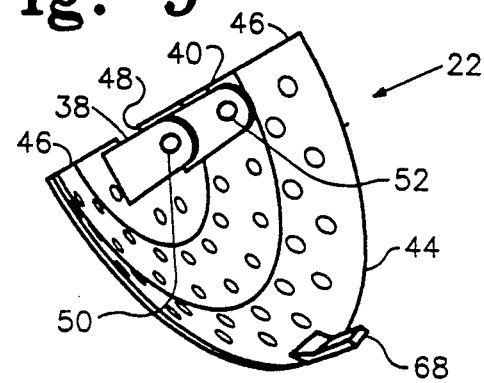
FIG. 10 is a perspective view showing another embodiment wherein a stop is disposed on the strainer basket portion.
Figure 11:
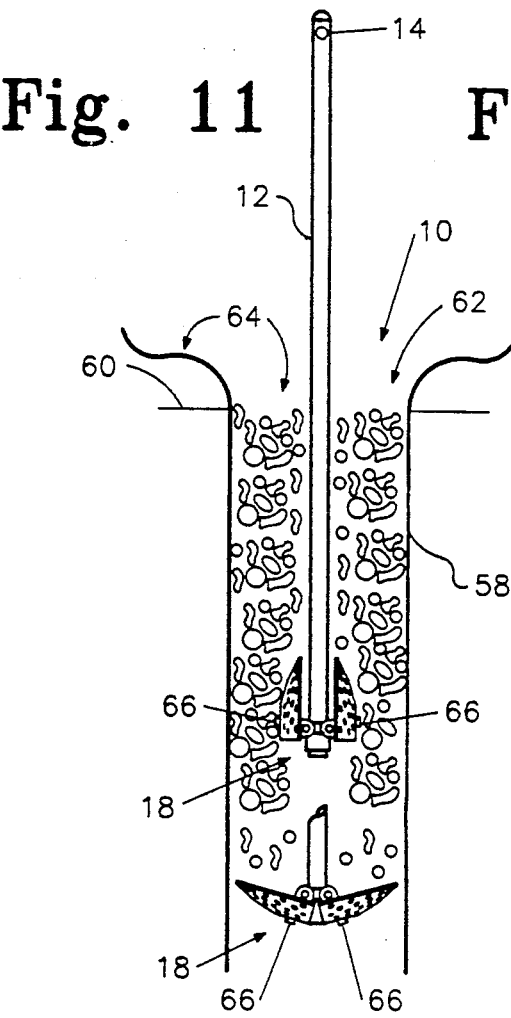
FIG. 11 and FIG. 12 show the relationship of the strainer basket portions having a baffle on the bottom thereof relative to the handle during insertion and withdrawal from a clogged bore.
Figure 12:
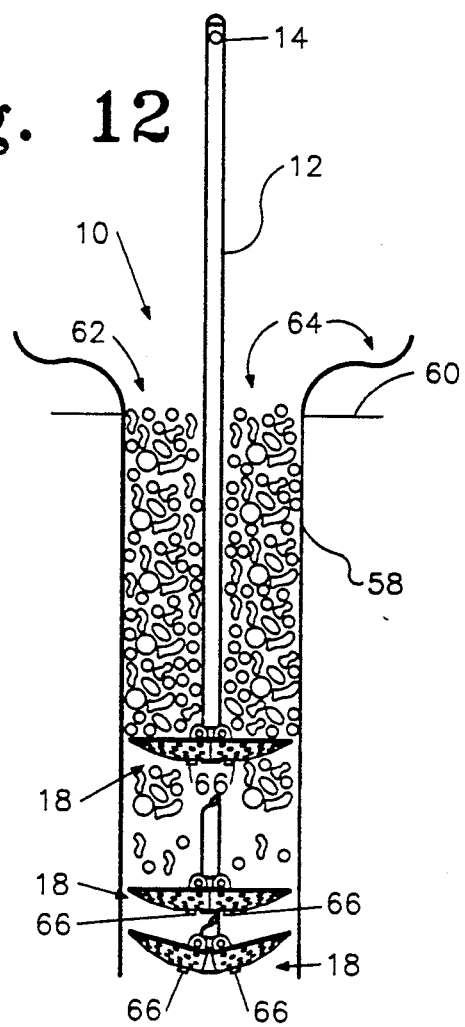

Alternate embodiments are shown in FIGS. 8, 9, and 10. In FIGS. 8 and 9 a baffle 66 is shown on the bottom of each strainer basket portion. The baffle is disposed so as to assist in moving the strainer basket portions to the closed position as strainer assembly 18 is inserted into the clogged bore and for initiating pivoting movement of the respective strainer basket portion to the open position as the ice skimmer is started to be withdrawn from the clogged bore. In this embodiment, as the ice skimmer is started to be withdrawn, water resistance will act on the baffle of each strainer basket portion and pivot the strainer basket portion a sufficient amount such that water will then exert force on the generally concave surface of the strainer basket portion and cause it to pivot to the open position wherein the continuous strainer basket is formed. In FIG. 10, a stop 68 of a predetermined length is shown disposed proximate the arcuate peripheral edge 44 such that the respective strainer basket portion will be positioned, when in the closed position, in a predetermined manner relative to the handle 12. Stop 68 positions the respective strainer basket portion such that as the ice skimmer is started to be removed from the clogged bore water resistance will pivot the respective strainer basket portion to the open position. The positions of the strainer basket portions relative to the handle during usage are generally similar for the embodiments shown in FIGS. 8 and 10 except for the closed position. The reaction of the strainer basket portions of these two embodiments to movement relative to the water in the clogged bore is essentially the same, i.e., when the ice skimmer is inserted into the clogged bore, the strainer basket portions are held in the closed position by the resistance of the water and when the ice skimmer is stopped and ready to be withdrawn from the clogged bore the strainer basket portions are not yet in the open position. As the ice skimmer is then started to be withdrawn from the clogged bore the resistance of the water against each strainer basket portion, and in the embodiment of FIG. 8 the water coacting with the baffle, pivots the respective strainer basket portion to the open position thereby forming the continuous strainer basket and permitting the removal of the ice chips and snow from the clogged bore.

It is preferable for the strainer basket portions, the hinge block, and the handle to all be formed of nonmetallic materials. It should also be understood that any materials may be used, but the use of plastic and wood is preferred because of the fact that the ice skimmer will float and that hands and mittens will not freeze to the device when wet. Also, ice is less likely to form on plastic and, when the handle is painted, ice is less likely to adhere to the painted surface. If ice does form on the plastic and painted wooden handle of the ice skimmer it will not bond tightly.

It is anticipated that any number of strainer basket portions may be used to form the continuous strainer basket. However, it has been found that the efficacy and economy of two strainer basket portions renders this number more desirable When utilizing two strainer basket portions it has been found that the continuous strainer basket will be slightly smaller than the diameter of the clogged bore within which it can be used. Utilizing more than two strainer basket portions will permit a continuous strainer basket of the same diameter as the clogged bore to be formed.

It is also anticipated that the ice skimmer of this invention may prove useful for removing debris other than ice and snow from a clogged bore in ice, e.g., scale from the clogged bore of a pipe.

Various modifications and changes other than those as discussed are contemplated without departing from the spirit and scope of the invention as hereinafter defined by the appended claims.

I claim:

1. A device for removing debris suspended in fluid within a clogged bore, said device comprising an elongate handle member having a distal portion and a strainer assembly attached to said distal portion, said strainer assembly including more than one strainer basket portion and a hinge assembly, said hinge assembly including a body portion having an axial bore axially aligned with and sized to receive said distal portion of said handle member and a hinge portion for attaching each respective strainer basket portion of said more than one strainer basket portion to said handle member, each hinge portion permitting pivoting of each respective strainer basket portion between a closed position wherein the strainer basket portions are disposed proximate the handle member and an open position in which the strainer basket portions form a strainer basket extending circumferential and generally perpendicular to a longitudinal axis of the handle member, each said strainer basket portion including means for stopping the respective strainer basket portion in the open position, the strainer basket formed by the strainer basket portions including a plurality of apertures therethrough opening generally in a direction parallel to the longitudinal axis of said handle member, whereby said strainer assembly may be inserted into the clogged bore with each strainer basket portion in the closed position and withdrawn from the clogged bore subsequent to each strainer basket portion being pivoted to form the strainer basket to thereby catch and remove debris from the clogged bore.

2. A device as set forth in claim 1 wherein each strainer basket portion is freely pivotal relative to the hinge assembly and the entire device is formed of nonmetallic materials.

3. A device as set forth in claim 2 wherein said strainer assembly is constructed of plastic and said hinge assembly is of a unitary molded construction.

4. A device as set forth in claim 3 wherein said hinge portion for each strainer basket portion includes oppositely extending hinge pins extending substantially perpendicular to a central axis of the axially aligned bore and each strainer basket portion includes a pair of spaced apart hinge arms having aligned apertures for receiving the hinge pins therein.

5. A device as set forth in claim 4 wherein said hinge arms are of a predetermined length and disposed on each respective strainer basket portion such that a pivot axis established by said hinge pins is spaced from a center of gravity of the strainer basket portion wherein downward movement of the strainer assembly in fluid tends to move each respective strainer basket portion to the closed position and no movement and upward movement permits the strainer basket portions to move to the open position.

6. A device as set forth in claim 5 wherein each said strainer basket portion includes a cutout stop means complementary in shape to a portion of an outer periphery of said handle member for stopping the respective strainer basket portion generally perpendicular to said central axis.

7. A device as set forth in claim 6 wherein each strainer basket portion includes a straight peripheral edge portion on each side of said cutout stop means and an arcuate peripheral edge portion connecting the straight peripheral edge portions.

8. A device as set forth in claim 7 wherein a second stop means is disposed proximate said arcuate peripheral edge portion of each strainer basket portion thereby spacing each respective strainer basket portion a predetermined distance from said handle member when the strainer basket portion is in the closed position.

9. A device as set forth in claim 1 wherein said distal portion is proximate a first end of said handle member and a length of rope is threaded through an aperture provided near a second end of said handle member and tied to form a wrist loop.

10. A device as set forth in claim 1 wherein said clogged bore is a hole drilled through ice covering a body of water such as found on rivers and lakes in winter and said debris is ice chips and snow.

11. A device for removing debris suspended in fluid within a clogged bore, comprising:
    an elongate handle member having a distal portion proximate a first end; and
    a strainer assembly, said strainer assembly including more than one foraminated strainer basket portion and hinge means for attaching each respective strainer basket portion to said distal portion of said handle member, each strainer basket portion of said more than one strainer basket portion including a stop means and being freely pivotal about said hinge means from a closed position to an open position wherein said stop means on each respective strainer basket portion positions each respective strainer basket portion in the open position to form a strainer basket extending circumferential and generally perpendicular to a longitudinal axis of said handle member, each respective strainer basket portion including a weight disposed near a peripheral edge to assist in moving the respective strainer basket portion to the open position.

12. A device as set forth in claim 11 wherein said more than one strainer basket portion includes two strainer basket portions.

13. A device as set forth in claim 11 wherein said stop means on each strainer basket portion includes a cutout complementary in shape to a portion of the periphery of a distal portion of the handle member and each strainer basket portion includes a straight peripheral edge portion on each side of said cutout and an arcuate peripheral edge portion connecting the straight peripheral edge portions.

14. A device as set forth in claim 13 wherein said strainer assembly is of a moldable plastic material which floats in water and said weight is disposed near said arcuate peripheral edge portion.

15. A device as set forth in claim 11 wherein said clogged bore is a hole drilled through ice covering a body of water such as found on rivers and lakes in winter and said debris is ice chips and snow.

16. A device for removing debris suspended in fluid within a clogged bore, comprising:
    an elongate handle member having a distal portion proximate a first end; and
    a strainer assembly, said strainer assembly including more than one foraminated strainer basket portion and hinge means for attaching each respective strainer basket portion to said distal portion of said handle member, each strainer basket portion of said more than one strainer basket portion being freely pivotal about said hinge means from a closed position to an open position and including a stop means wherein said stop means on each respective strainer basket portion positions each respective strainer basket portion in the open position to form a strainer basket extending circumferential and generally perpendicular to a longitudinal axis of said handle member, each respective strainer basket portion including a baffle means disposed on a bottom side thereof to assist in pivoting the strainer basket portion to the open position.

17. A device as set forth in claim 16 wherein said more than one strainer basket portion includes two strainer basket portions.

18. A device as set forth in claim 16 wherein said stop means on each strainer basket portion includes a cutout complementary in shape to a portion of a periphery of the distal portion of the handle member and each strainer basket portion includes a straight peripheral edge portion on each side of said cutout and an arcuate peripheral edge portion connecting the straight peripheral edge portions.

19. A device as set forth in claim 16 wherein said baffle means is generally arcuate, said baffle means being disposed so as to optimize its effectiveness in maintaining each respective strainer basket portion in the closed position as the strainer assembly is inserted into the clogged bore and to assist in moving the respective strainer basket portion to the open position as the strainer assembly is in the initial stages of being removed from said clogged bore.

20. A device as set forth in claim 16 wherein said clogged bore is a hole drilled through ice covering a body of water such as found on rivers and lakes in winter and said debris is ice chips and snow.

* * * * *